INVENTOR.
JAMES A. FORBES

INVENTOR.
JAMES A. FORBES

BY *Sughrue, Rothwell, Mion, Zinn & Macpeak*

ATTORNEYS.

United States Patent Office 3,522,439
Patented Aug. 4, 1970

3,522,439
AUTOMATIC-TO-MANUAL SWITCHING SYSTEM
FOR A PROCESS CONTROLLER
James A. Forbes, Hatboro, Pa., assignor, by mesne assignments, to Robertshaw Controls Company, Richmond, Va., a corporation of Delaware
Filed Oct. 28, 1964, Ser. No. 407,171
Int. Cl. G05b 7/00
U.S. Cl. 307—29       4 Claims

ABSTRACT OF THE DISCLOSURE

A switching system for use in a process controller for switching between automatic and manual modes of operation. A dual input modulator-amplifier means is provided with an input switching arrangement adapted to reduce the undesirable effects of switch leakage currents on the system by grounding either the automatic or the manual signal input terminal to the modulator amplifier when the other mode of operation is in use.

---

This invention relates broadly to automatic-to-manual mode switching of a process controller and, more specifically, to an improved switching arrangement wherein the undesirable effects of switch leakage are eliminated.

It is well known in the prior art of process control systems to provide bumpless switching from automatic-to-manual mode of operation. Generally, smooth or bumpless switching is accomplished by balancing the manual control voltage against the controller output voltage prior to the switchover, consequently, when the manual control is switched in, the process control system does not experience any undesirable transient effects which would cause sudden changes in the load or output current which is controlling a process. Hoewer, since the controller input signals are relatively low level signals and since the computing or transfer function networks of the controller have very high gain, high impedance components, such as operational amplifiers, the leakage currents flowing between disconnected terminals of the mode switching means develop undesired leakage voltages which are applied to the controller input and thereby interfere with the precise operation of the controller.

Therefore, the primary object of this invention is to provide an improved switching arrangement for selectively connecting two power sources to a high impedance network to eliminate the undesirable effects of the switch leakage currents upon the high impedance network.

A more specific object is to provide dual imput circuits for the high impedance network and a switching means which simultaneously connects one input circuit to one of the power sources and connects the other input circuit to ground so that the switch leakage currents are shunted to ground and eliminated from the input of the high impedance network.

Another object is to provide a switching arrangement for a process controller with dual input terminals, one for the automatic mode of operation and one for the manual mode of operation, so that when the controller is switched from one mode of operation to the other, the disconnected input terminal is immediately grounded to shunt the switch leakage current away from the controller input.

Other objects and advantages of this system will become apparent from the following written description taken in conjunction with the accompanying drawings which together explain in detail a preferred embodiment of this invention.

Figure 1:
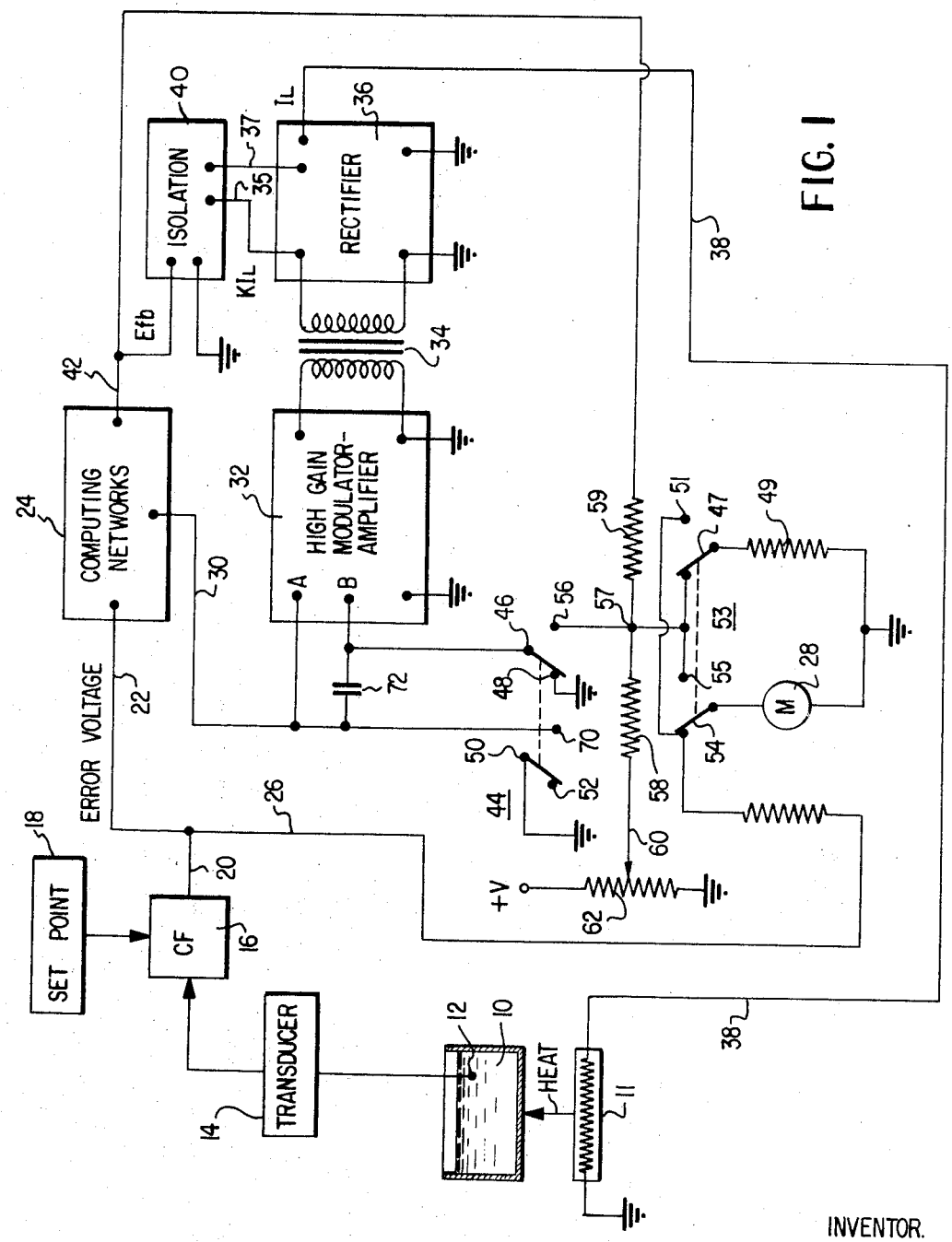
FIG. 1 is a semi-schematic diagram of a process control system incorporating a preferred embodiment of this improved switching arrangement.

The process control system shown in FIG. 1 is a controller in which my improved automatic-to-manual mode switching arrangement may be used. The controller is a four-terminal device wherein its load terminals are not conductively connected to its input terminals. As an example, the process being controlled is the temperature of a liquid 10 whose temperature is controlled by an electric heater 11, sensed by a thermometer 12, and converted by a suitable transducing means 14 to a DC voltage which is applied as one input to a voltage comparison circuit 16. A reference or set-point voltage indicative of the desired liquid temperature is applied to another input of comparison circuit 16 from a suitable reference source labeled SET POINT 18. The output of comparison circuit 16 appears on conductor 20 as a DC error or deviation voltage which is applied via conductor 22 to the input of computing networks 24 which determine the transfer function of the process controller. The DC error voltage is also applied via conductor 26 to a meter 28 which monitors the DC error voltage.

The output of the computing networks 24 is applied via conductor 30 to the summing or input terminal A of a dual input modulator-amplifier circuit 32. Circuit 32 includes a dual input DC to AC modulator or converter which modulates a 250 kc. signal with the input at terminal A so that the input may be amplified by a high gain, high impedance network, such as an operational amplifier, which is also part of circuit 32.

The output of the circuit 32 is inductively coupled via transformer 34 to a rectifier 36 whose output is the load or output current $I_L$ of the controller. $I_L$ is fed back via conductor 38 to heater 11 to maintain the desired temperature of liquid 10. When the liquid temperature corresponds to the SET POINT temperature, the DC error voltage is zero.

Before the output circuit 32 is rectified, the modulated output $KI_L$ of transformer 34 is fed via conductors 35 and 37 to an isolation circuit 40 which is coupled to transformer 34. Isolation circuit 40 has a transformer input and makes the controller a four-terminal device. Circuit 40 rectifies $KI_L$ to provide as an output feedback voltage $E_{fb}$ which is fed back to the computing networks via conductor 42. Consequently, $E_{fb}$ is proportional to load current $I_L$ and in the steady state condition is equal to the input voltage at terminal A.

In the system of FIG. 1, an automatic-manual mode switch 44 is shown in its automatic mode position. In this condition a second terminal A of circuit 32 is grounded via switch arm 46 and grounded contact 48. Grounded switch arm 50 is in engagement with a floating switch contact 52. To switch from the automatic to the manual mode, a balancing switch 53 is first operated to move switch arm 54 to contact 55 and arm 49 to contact 51, thereby grounding through meter 28 switch contact 56 and the junction 57 of resistors 58 and 59. Resistor 47 has the same value as the internal resistance of meter 28. Junction 57 is connected through a wiper arm 60 to a resistor 62 which is connected between ground and a power supply +V. Wiper 60 is then adjusted until the meter 28 indicates a null, thereby indicating that junction 57 and switch contact 56 are at zero or ground potential. Consequently, switch-over to manual mode may now occur in bumpless fashion. The actual switch-over is accomplished by moving the ganged switch arms 50 and 46 to the right so that they engage contacts 70 and 56, respectively. It can be seen that the automatic mode summing input terminal A is now grounded and the previously grounded manual input terminal B is connected to switch contact 56 which is also a ground potential. Consequently, the process control system does not experience any change in control voltage and therefore the process is not disturbed by the switch-over. The load current $I_L$ will now follow variations in the manual control voltage as wiper 60 is moved along resistor 62.

An important feature of this switching arrangement is that in the automatic mode of operation, the manual input terminal B is grounded and in the manual mode of operation, the high impedance summing input terminal A is grounded. Consequently, any leakage currents flowing between open circuited switch contacts and the disconnected input terminal A or B are directly short-circuited to ground, thereby eliminating the undesired effects which would be caused by the application of these currents to the disconnected summing input terminal of the dual input modulator-amplifier 32. The elimination of switch leakage is extremely important in such high impedance, low signal level systems since the leakage currents and resulting voltages approach the same level of magnitude as the signal voltages applied to the input of the high impedance circuit. Of course, this same switching arrangement eliminates the effects of switch leakage when input signal sources are of the high impedance type rather than the network to which the sources are connected.

Capacitor 72 is connected to the manual input terminal B and has a value of capacitance much greater than that of the transient switching capacitance of mode switch 44 thereby preventing any switch capacitance from generating a voltage between terminals A and B.

Figure 2:
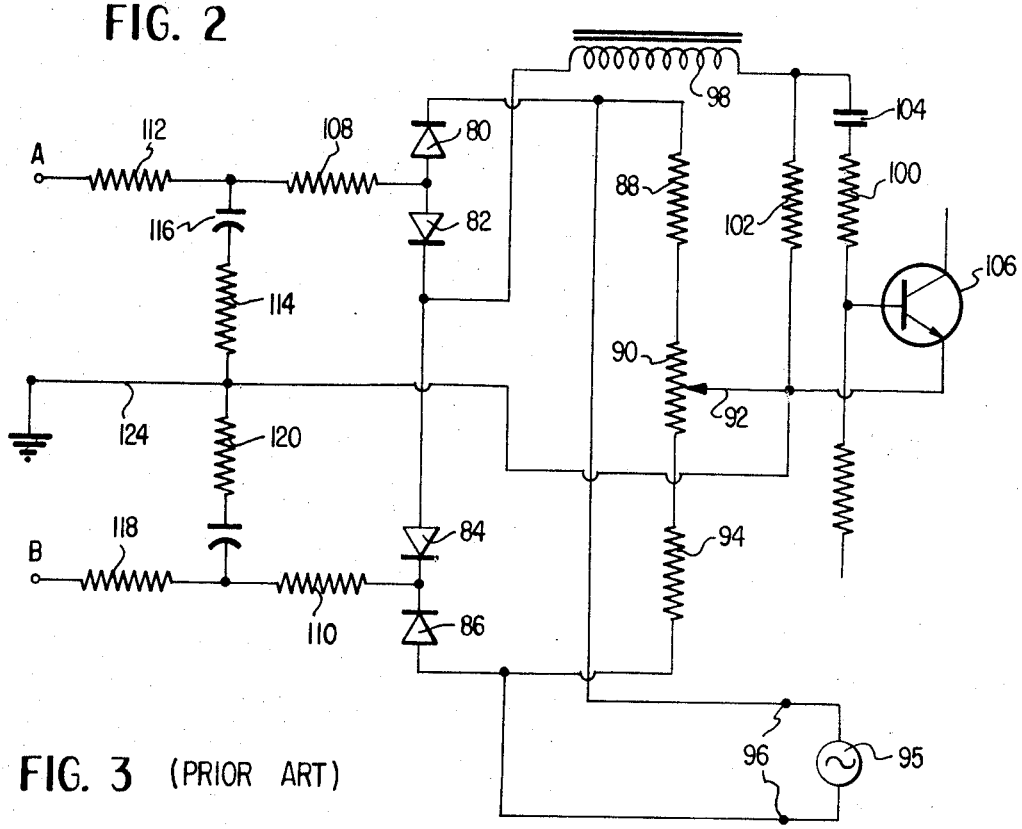
FIG. 2 is a schematic diagram of a dual input modulator-amplifier suitable for use with the improved switching arrangement in the process control system of FIG. 1.

The input circuits of modulator-amplifier 32 are shown in more detail in FIG. 2. Basically, circuit 32 contains a DC to AC dual input, bridge type modulator plus a high gain amplifier. Either the automatic control signal is applied to input terminal A or the manual control voltage is applied to input terminal B. The dual input modulator is a bridge type modulator including voltage sensitive diode capacitors 80 and 82 connected in series to form one leg of the bridge circuit. Variable capacitance diodes 84 and 86 are connected in series to form another leg of the bridge. Resistor 88 and a portion of resistor 90 above the wiper 92 form a third leg. Resistor 94 and the lower portion of resistor 90 form the fourth leg. The modulating carrier source 95 is connected across the bridge terminals 96. Carrier modulation is accomplished by variation in bridge transmission. The capacitive reactance of the bridge is tuned to resonance at approximately 250 kc. with inductor 98. Resistor 100 allows an open loop Q adjustment. Resistor 102 and capacitor 104 form a decoupling network which prevents the DC voltage on the base of transistor 106 from disturbing the bridge balance. Transistor 106 represents the first stage of a plural stage high gain AC amplifier. Resistors 108 and 110 serve to isolate the carrier frequency bridge from the DC input terminals A and B. Resistors 112 and 114 in conjunction with capacitor 116 form a compensated lag network in the DC circuit for the purpose of stabilizing the amplifier. Resistors 118 and 120 in conjunction with capacitor 122 perform the same function for the B input terminal.

The relationship between applied voltage and depletion layer capacitance of the diodes for an abrupt PN junction may be written $$C = \frac{K}{\sqrt{V}}$$

where V is the algebraic sum of applied voltage plus diode barrier potential. The diode pairs in each leg of the bridge are arranged in such a manner as to increase the bridge transmission when either input terminal A or B is made more positive than the computing network common wire 124. Such a circuit arrangement is necessary to preserve proper phasing of the amplifier in either manual or automatic modes of operation.

Figure 3:
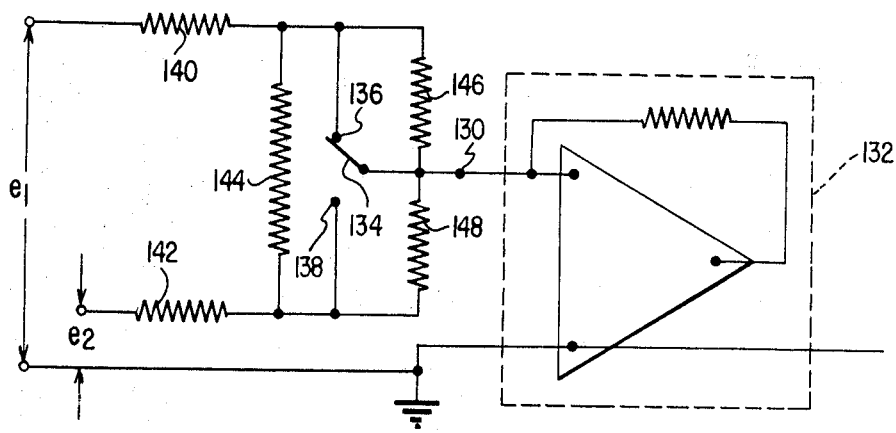
FIG. 3 is a circuit diagram illustrating the problem of switch leakage inherent in prior art arrangements which selectively switch plural input sources to a single input, high impedance circuit.

FIG. 3 shows the prior art arrangement for switching dual voltage signal sources $e_1$ and $e_2$ to the single input terminal 130 of a high impedance circuit 132 such as an operational amplifier. A conventional single-pole double-throw switch 134 has its movable arm connected to input terminal 130 and its fixed contacts 136 and 138 connected to the signal sources $e_1$ and $e_2$, respectively. Resistors 140 and 142 are current limiting resistors. Resistances 144, 146 and 148 represent the various leakage resistances across the switch terminals. For example, resistance 144 represents the leakage between fixed contacts 136 and 138; resistance 146 represents the switch leakage between input terminal 130 and fixed contact 136; and resistance 148 represents the leakage between input terminal 130 and fixed contact 138.

It can be easily seen that where signals $e_1$ and $e_2$ are low level signals which are being switched into the very high impedance circuit 132, the currents flowing through the leakage resistances 144, 146 and 148 will approach the general magnitude of the signal current being applied to input terminal 130 and thereby cause undesired variations in the input signal applied to the high impedance amplifier circuit 132. My improved switching network overcomes this switch leakage problem by providing a dual input high impedance circuit and grounding the input which is not connected to a signal source.

Figure 4:
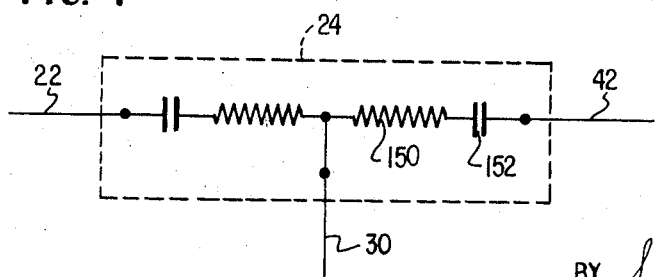
FIG. 4 shows some of the transfer function circuits in the computing networks of FIG. 1.

FIG. 4 shows some of the actual circuit components included in the computing networks 24 in FIG. 1. The important circuit components here are the resistor 150 and the reset capacitor 152 which performs the reset or time integrating function of the controller in automatic mode. FIG. 4 is included for the purpose of showing that the switch-over from manual to automatic mode is also smooth or bumpless. In this controller, the manual mode control voltage is also applied through the modulator and high gain circuits. In prior art systems, the manual control voltage is normally by-passed around the circuits and applied directly to the output of the controller. In the FIG. 1 arrangement, however, the controller feedback voltage $E_{fb}$ follows the output current $I_L$, even in the manual mode.

Switching from manual mode to automatic mode can be done without disturbing the response of the control system by simply returning the mode switch 44 to the automatic position, i.e., by moving switch arms 50 and 46 into engagement with switch terminals 52 and 46, respectively.

This smooth transfer can be understood by considering the action of the computing network reset capacitor 152 when the controller output or load current $I_L$ is following the manual control voltage on wiper arm 60. As the load current changes in response to the manual loading signal, the voltage $E_{fb}$ at the amplifier output follows it. Capacitor 152 is connected between the output of the controller and ground and continually matches its voltage to that between ground and $E_{fb}$. For all practical purposes, the difference between voltages $E_{fb}$ and the voltage across capacitor 152 is zero at a fraction of a second after $E_{fb}$ has changed. Therefore, raising input terminal A and capacitor 152 from ground or zero voltage by returning the mode switch 44 to automatic mode will leave a zero or ground voltage at point A and will cause no disturbance in the output of the controller.

There are many advantages to the dual input modulator-amplifier circuit and grounding switching arrangement illustrated in FIG. 1. Such an arrangement permits even the manual control voltage to be applied through the controller high gain circuits thereby permitting use of a single power supply for both the modulator-amplifier circuits and the manual control source.

Furthermore, in the manual mode, the modulator-high gain amplifier circuits permit constant current operation in the manual mode, i.e., the output current $I_L$ remains constant with respect to change in load because of the high gain, high impedance circuits being utilized.

Other prior art systems using a dummy load for the modulator-amplifier during manual load operation encounter switching problems because of the high impedance circuits which are being switched.

A preferred embodiment of this invention has been described in the foregoing description and illustrated in the attached drawings, but it is specifically contemplated that modifications thereof and additions thereto will be obvious to those skilled in the art, and such modifications and additions are to be considered part of this invention, the scope of which is limited only as defined in the appended claims.

What is claimed is:

1. In a process control system for maintaining a variable condition at a set point and including automatic and manual control modes, a controller comprising: a high gain, high impedance circuit having two input channels, an electrical ground for said controller, means for automatically producing a first control signal in response to a deviation of the condition from the set point, computing network means modifying said first control signal in accordance with a time function of the change, said computing network means being connected between the output and one input of said high impedance circuit, manual control means for generating a second control signal, mode switching means for selectively applying said modified first control signal to one of said input channels or said second control signal to the other of said input channels, and means responsive to said switching means short-circuiting to ground the input channel to which no control signal is applied.

2. The controller as claimed in claim 1 wherein said manual control means includes means for reducing said second control signal to substantially ground level.

3. The controller as claimed in claim 2 further comprising a signal monitoring means, switch means for selectively connecting a signal representing said deviation or said second control signal to said monitoring means.

4. A switching network for providing substantially bumpless switching between first and second signal sources which are to be connected, only one at a time, to first and second terminals respectively of a circuit for operating on first and second signals produced by said first and second signal sources, said network comprising:
(a) connecting means directly connecting said first signal source to said first terminal,
(b) first switching means for switchably connecting said first terminal to ground level potential,
(c) second switching means for switchably and selectively connecting said second terminal to said second source or to ground level potential, said first and second switching means being ganged together to cause said first terminal to be connected to ground level when said second terminal is connected to said second source,
(d) monitoring means for monitoring the signal level of the signal produced by said second source.

References Cited
UNITED STATES PATENTS

| | | | |
|---|---|---|---|
| 2,916,702 | 12/1959 | Bigelow | 330—147 X |
| 3,077,552 | 2/1963 | Koppel. | |
| 3,295,033 | 12/1966 | Davis et al. | |
| 3,340,408 | 9/1967 | Ogawa et al. | 307—112 |

ORIS L. RADER, Primary Examiner

W. E. DUNCANSON, JR., Assistant Examiner